United States Patent
Yu et al.

(10) Patent No.: US 8,387,780 B2
(45) Date of Patent: Mar. 5, 2013

(54) CORD AND POLYMER JACKET ASSEMBLY HAVING AN ADHESION ENHANCER IN THE POLYMER JACKET MATERIAL

(75) Inventors: Xiaomei Yu, Glastonbury, CT (US); Gopal R. Krishnan, Wethersfield, CT (US); John P. Wesson, Vernon, CT (US); John M. Milton-Benoit, West Suffield, CT (US)

(73) Assignee: Otis Elevator Company, Farmington, CT (US)

( * ) Notice: Subject to any disclaimer, the term of this patent is extended or adjusted under 35 U.S.C. 154(b) by 146 days.

(21) Appl. No.: 13/000,630

(22) PCT Filed: Aug. 15, 2008

(86) PCT No.: PCT/US2008/073244
§ 371 (c)(1),
(2), (4) Date: Dec. 22, 2010

(87) PCT Pub. No.: WO2010/019152
PCT Pub. Date: Feb. 18, 2010

(65) Prior Publication Data
US 2011/0108387 A1 May 12, 2011

(51) Int. Cl.
*B65G 15/34* (2006.01)
(52) U.S. Cl. .................. 198/847; 198/337
(58) Field of Classification Search ............. 198/846, 198/847, 337
See application file for complete search history.

(56) References Cited

U.S. PATENT DOCUMENTS

| | | | |
|---|---|---|---|
| 3,748,291 A | 7/1973 | Bhakuni | |
| 4,019,941 A * | 4/1977 | Prince et al. | 198/847 |
| 4,785,033 A | 11/1988 | Mowdood | |
| 4,928,812 A * | 5/1990 | van Calker et al. | 198/847 |
| 4,982,829 A | 1/1991 | Johnson et al. | |
| 6,540,060 B1 | 4/2003 | Fargo et al. | |
| 2003/0213540 A1 * | 11/2003 | Burkholder et al. | 152/209.1 |
| 2004/0089520 A1 * | 5/2004 | Hymes et al. | 198/846 |
| 2006/0182967 A1 | 8/2006 | Kosaka et al. | |
| 2008/0132615 A1 | 6/2008 | Peerlings et al. | |

FOREIGN PATENT DOCUMENTS

| | | |
|---|---|---|
| CA | 1223693 | 6/1987 |
| DE | 3410889 A1 | 2/1986 |
| DE | 29924773 U1 | 7/2005 |
| JP | 2004131916 | 4/2004 |
| WO | 0037738 | 6/2000 |
| WO | 0138426 A1 | 5/2001 |
| WO | 2005097900 A1 | 10/2005 |
| WO | 2007055701 A1 | 5/2007 |
| WO | 2010-019149 A1 | 2/2010 |
| WO | 2010-019150 A1 | 2/2010 |

OTHER PUBLICATIONS

"Melamine Derivatives," (Oct. 22, 2007), Retrieved from the Internet: URL:http://web.archive.org/web/20071022175659/ http://specialchem4polymers.com/tc/Melamine-Flame-Retardants/index.aspx?id+4004.

(Continued)

*Primary Examiner* — James R Bidwell
(74) *Attorney, Agent, or Firm* — Carlson, Gaskey & Olds PC

(57) ABSTRACT

An exemplary assembly includes at least one elongated tension member (32). A jacket covers at least some of the tension member (32). The jacket comprises a polymer material (68, 64) including an adhesion enhancer (62) that facilitates adhesion between the tension member and the jacket.

15 Claims, 3 Drawing Sheets

OTHER PUBLICATIONS

International Preliminary Report on Patentability for International application No. PCT/US2008/073244 mailed Feb. 24, 2011.

International Search Report and Written Opinion of the International Searching Authority for International application No. PCT/US2008/073244 mailed Apr. 17, 2009.

* cited by examiner

CORD AND POLYMER JACKET ASSEMBLY HAVING AN ADHESION ENHANCER IN THE POLYMER JACKET MATERIAL

BACKGROUND

There are various uses for elongated flexible assemblies such as for elevator load bearing members or roping arrangements, drive belts for machines such as a passenger conveyor and handrails for passenger conveyors, for example. Such assemblies may be designed with a plurality of cords covered by a polyurethane jacket. For example, U.S. Pat. Nos. 6,295,799 and 6,739,433 show belts for use in suspending an elevator car and counterweight within an elevator system. An example passenger conveyor handrail construction is shown in U.S. Pat. No. 4,982,829. An example passenger conveyor drive belt is shown in U.S. Pat. No. 6,540,060.

One aspect of such assemblies is that having a polymer jacket associated with a tension member such as a steel cord typically requires some load transfer between the jacket material and the cord while the assembly is in use. The strength of the assembly is related to the pull-out strength that corresponds to a load at which separation will occur between the jacket material and the tension members. Improving the pull-out strength of such an assembly improves the overall strength of the assembly and the ability to withstand higher load conditions.

SUMMARY

An exemplary assembly includes at least one elongated tension member. A jacket covers at least some of the tension member. The jacket comprises a polymer material including an adhesion enhancer that facilitates adhesion between the tension member and the jacket.

An exemplary method of making an assembly having at least one elongated cord tension member at least partially covered by a polymer jacket includes mixing an adhesion enhancer with a polymer base resin to provide a master batch of mixed material. The mixed material is then compounded with a base polymer material to yield a jacket material. The jacket material is then hot pressed against the tension member to form a desired shape of the jacket and to adhere the jacket to an exterior of the tension member.

The various features and advantages of the disclosed examples will become apparent to those skilled in the art from the following detailed description. The drawings that accompany the detailed description can be briefly described as follows.

DETAILED DESCRIPTION

Figure 1:
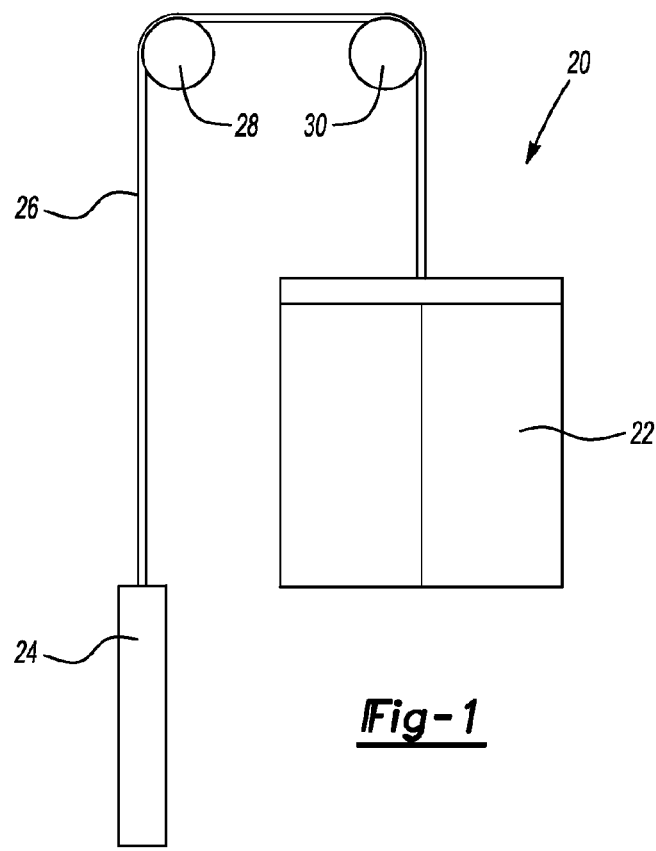
FIG. 1 schematically illustrates selected portions of an elevator system including a load bearing member designed according to an embodiment of this invention.

FIG. 1 schematically shows selected portions of an example elevator system 20. An elevator car 22 and counterweight 24 are suspended by a load bearing assembly 26. In one example, the load bearing assembly 26 comprises a plurality of flat belts. In another example, the load bearing assembly 26 comprises a plurality of round ropes.

The load bearing assembly 26 supports the weight of the elevator car 22 and the counterweight 24 and facilitates movement of the elevator car 22 into desired positions by moving along sheaves 28 and 30. One of the sheaves will be a traction sheave that is moved by an elevator machine in a known manner to cause the desired movement and placement of the elevator car 22. The other sheave in this example is an idler sheave.

Figure 2:
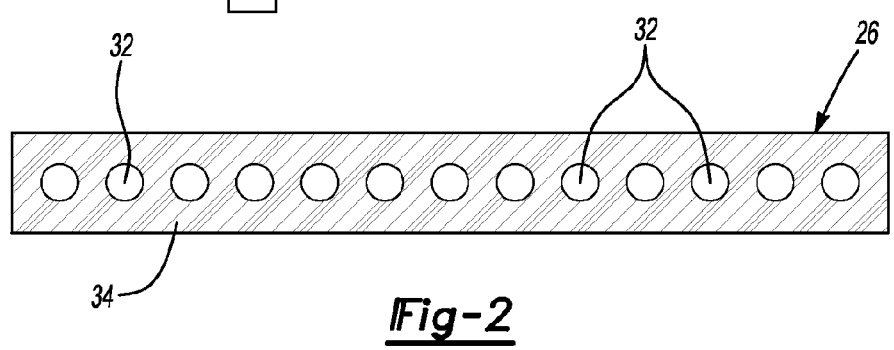
FIG. 2 is an end view schematically showing one example elevator load bearing member assembly.

FIG. 2 is an end view schematically showing one example flat belt configuration of the example load bearing assembly 26. In this example, the flat belt includes a plurality of elongated cord tension members 32 and a polymer jacket 34 that contacts the tension members 32. In this example, the jacket 34 encases the tension members 32. In one example, the tension members 32 comprise wound metallic cords, such as steel. The polymer jacket 34 in one example comprises a thermoplastic elastomer. In one example, the jacket 34 comprises a thermoplastic polyurethane.

Figure 3:
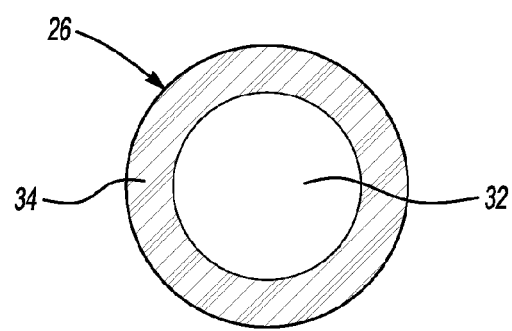
FIG. 3 is an end view schematically illustrating another example elevator load bearing assembly.

Another example is schematically shown in FIG. 3. An end view of a rope used as part of the load bearing assembly 26 includes at least one tension member 32 and a polymer jacket 34. In the example of FIG. 3, the same materials can be used as those mentioned above.

The load on the example belt is carried by the tension members 32. The interaction between the jacket 34 and the sheaves 28, 30 involves transferring loads to the tension members 32. Greater adhesion between the jacket 34 and the tension members 32 provides enhanced load carrying performance. In each of the examples of FIGS. 2 and 3 the polymer material for the jacket 34 includes an adhesion enhancer that facilitates adhesion between exterior surfaces on the tension members 32 and the material of the jacket 34.

Figure 4:
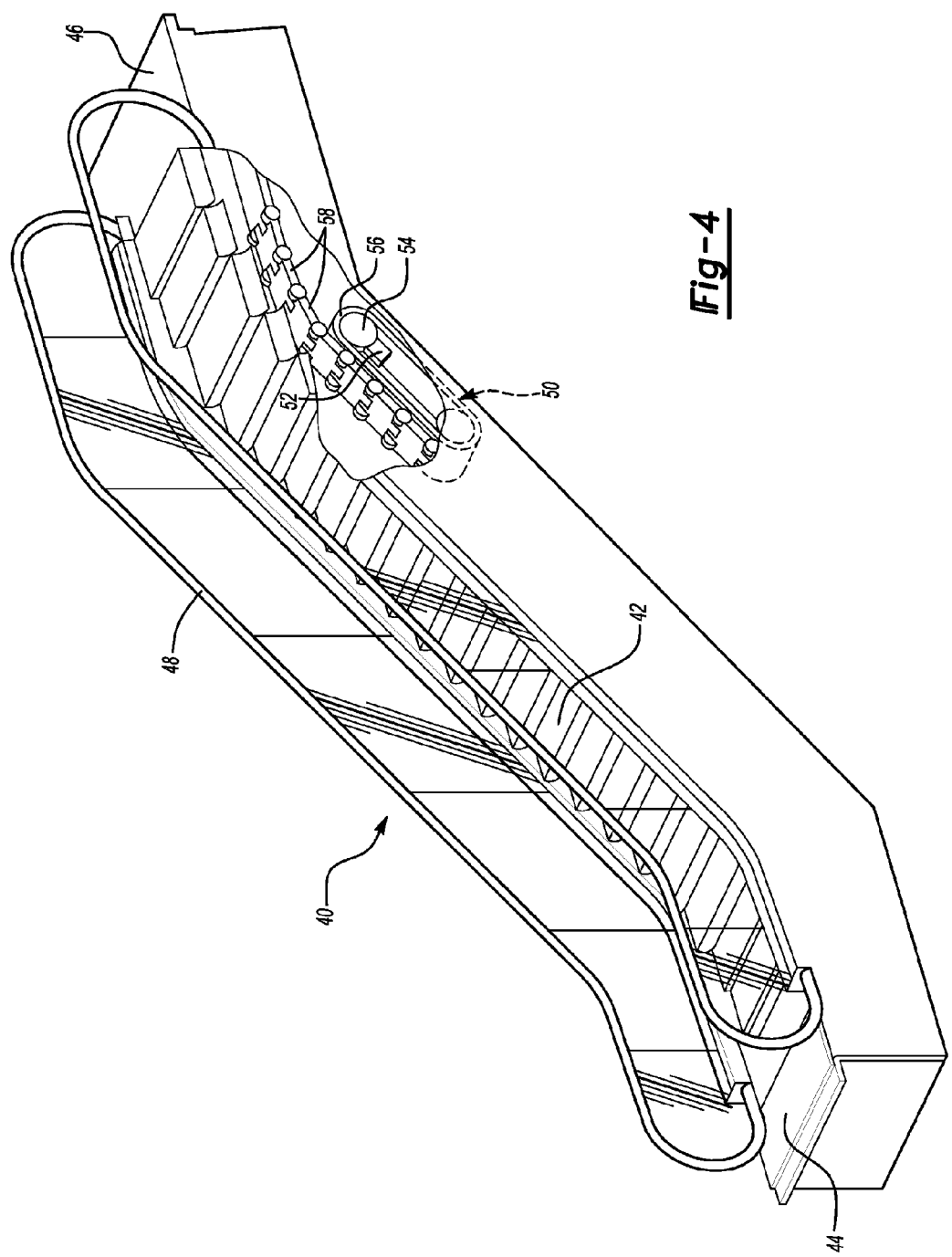
FIG. 4 diagrammatically illustrates a passenger conveyor including a drive belt and a handrail designed according to an embodiment of this invention.

FIG. 4 schematically illustrates an example passenger conveyor 40. In this example, a plurality of steps 42 move in a known manner to carry passengers between landings 44 and 46. A handrail 48 is provided for passengers to grab onto while traveling on the conveyor 40.

Figure 6:
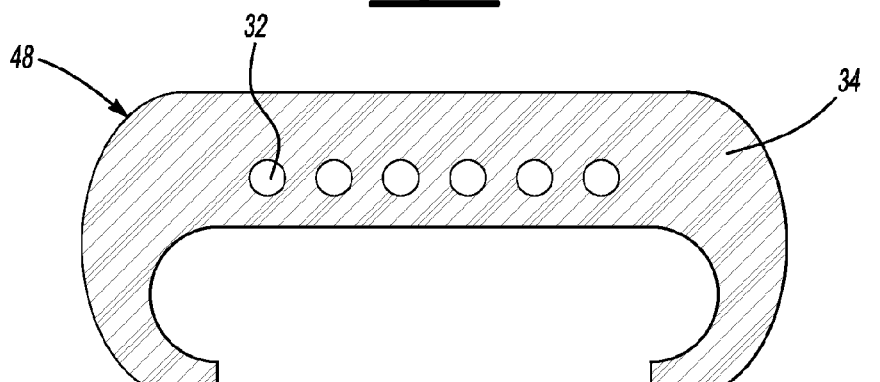
FIG. 6 schematically shows an example handrail configuration.

As shown in FIG. 6, the handrail 48 includes a plurality of tension members 32 such as steel cords at least partially covered by a polymer jacket 34. The polymer jacket in this example establishes the gripping surface and the body of the handrail 48. The polymer jacket material includes at least one adhesion enhancer that facilitates adhesion between the tension members 32 and the jacket 34.

Figure 5:
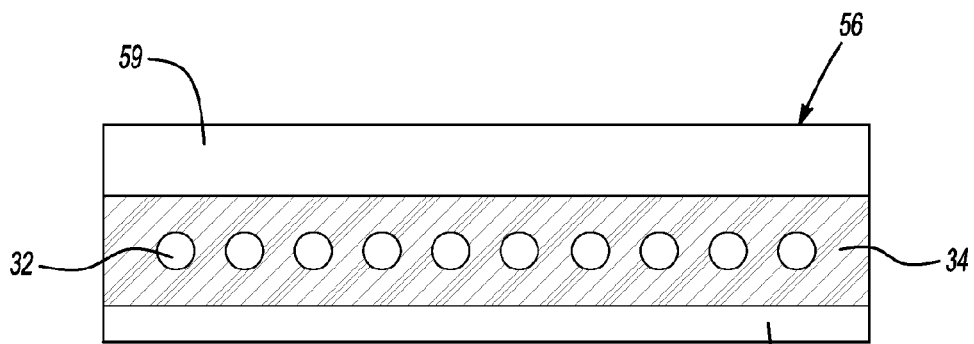
FIG. 5 schematically shows an example drive belt configuration.

The example of FIG. 4 and includes a drive arrangement 50 for propelling the steps 42 in a desired direction. A motor 52 rotates a drive sheave 54 to cause movement of a drive belt 56. As shown in FIG. 5, the example drive belt 56 has a plurality of elongated cord tension members 32 covered by a jacket 34. The jacket material establishes teeth 57 that interact with a corresponding surface on the drive sheave 54. A step chain 58 (FIG. 4) is engaged by teeth 59 on the drive belt 56 to cause the desired movement of the steps 42.

In this example, the drive belt 56 includes a polymer jacket material with at least one adhesion enhancer that facilitates adhesion between the exterior of the tension members 32 and the jacket 34.

When a metal is used for the any of the example tension members 32, the metal material may be uncoated, coated, or plated with a protective metal. For example, a base ferrous metal may be coated or plated with zinc, tin or copper.

Figure 7:
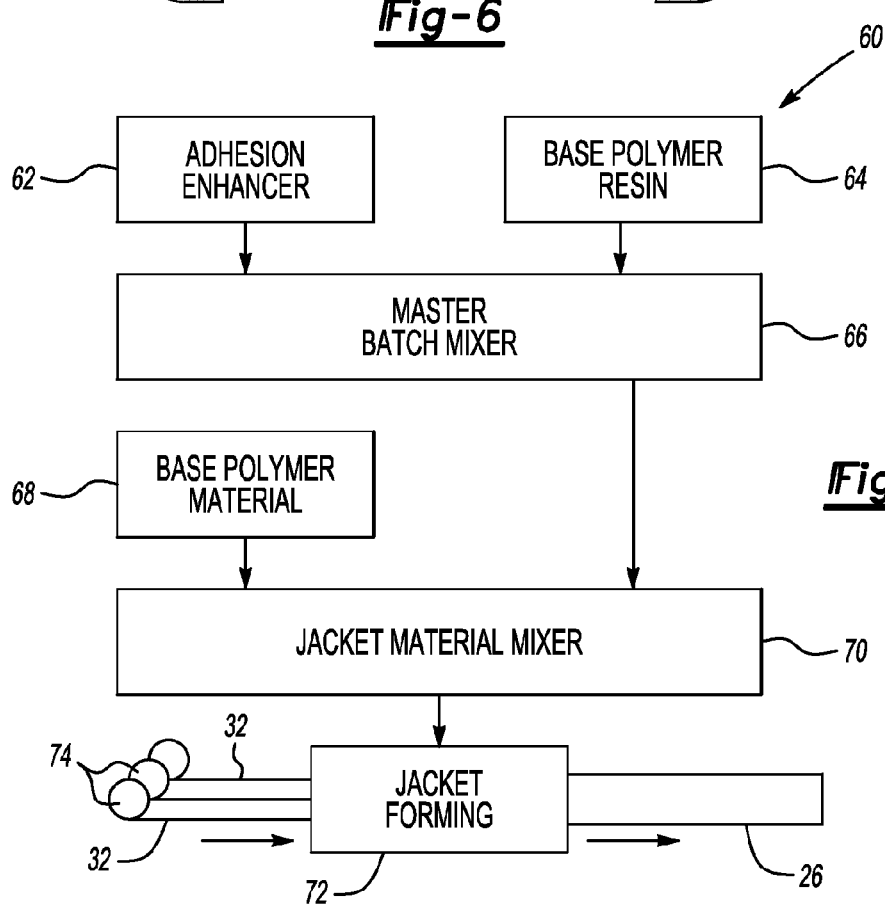
FIG. 7 schematically illustrates an example method of making an assembly designed according to an embodiment of this invention.

FIG. 7 schematically illustrates one possible method at 60 of making an assembly such as an elevator load bearing member, a passenger conveyor handrail or a drive belt such as that used for a passenger conveyor. A supply of adhesion enhancer 62 is mixed with a base polymer resin 64 in a master batch mixer 66. The adhesion enhancer 64 is one of melamine-based, phosphate-based or both. Example adhesion enhancers include melamine cyanurate, melamine-phosphate, melamine-pyrophosphate and melamine-polyphosphate. Such adhesion enhancers are useful for the example assemblies for facilitating satisfactory adhesion between the jacket and the tension members at least partially covered by the jacket. The adhesion enhancer has an affinity for the interface between the jacket material and the material of the tension member and the adhesion enhancer acts like a coupling agent between the two materials. The adhesion enhancer has a polar interaction with a metallic cord surface when the tension members comprise a metal material (such as steel). The adhesion enhancer, such as the phosphates mentioned above, provides a favorable change of the polarity of the polymer based material to provide a stronger interaction between the polymer and the tension member exterior surface.

In one example, the amount of adhesion enhancer mixed with the base polymer resin in the master batch mixer 66 is between 20% and 50% by weight. The resulting master batch of mixed material in this example is then compounded with a base polymer material 68 in a jacket material mixer 70. The resulting jacket material after the mixing at 70 may contain up to 20% by weight of the adhesion enhancer. One example includes from 0.2% to 20% by weight of the adhesion enhancer in the jacket material. In one example, the resulting polymer material in the jacket material mixer 70 comprises between about 0.2% and about 10% by weight of the adhesion enhancer.

Providing a melamine-based or phosphate-based adhesion enhancer in an amount up to 20% by weight of the jacket polymer material increases the strength of the assembly by increasing the adhesion strength or pull-out strength as a result of increased adhesion between the tension members and the jacket material. In one example, the adhesion strength is increased up to twice that if the base polymer material does not have at least one of the example adhesion enhancers. Providing at least 0.2% by weight of the adhesion enhancer is believed to provide a useful increase in strength. Providing up to 20% by weight of the adhesion enhancer can provide additional strength increase without reducing the flexibility and other desirable characteristics of the base polymer material so that the jacket functions as desired for its particular application (e.g., is able to follow a guidance when the assembly comprises a passenger conveyor handrail, is able to transmit a sufficient drive force when the assembly comprises a drive member such as a belt or is able to wrap around sheaves and achieve sufficient traction for moving an elevator car when the assembly comprises an elevator load bearing member).

The jacket material is then formed in a jacket forming station 72 such as a molding device to provide the desired geometry of the jacket. In the illustrated example, a plurality of spools 74 supply tension members 32 to the jacket forming station 72 where the jacket is molded onto at least one exterior surface of the tension members 32 resulting in the desired assembly. In the case of FIG. 5, the resulting assembly is an elevator load bearing member 26.

Having sufficient adhesion between the jacket and the tension member is useful for maintaining a desired strength of the assembly. Pull-out strength of an elevator load bearing member, for example, refers to the ability of the tension member to be pulled relative to the jacket material responsive to a load on the load bearing member. Higher pull-out strength is associated with better adhesion between the jacket material and the tension members. Higher pull-out strength provides a better strength characteristic of the load bearing assembly. The adhesion enhancer of the disclosed examples provides an increase in strength and stiffness so that there is a better interaction between the tension member exterior surface and the jacket.

The increased adhesion of the example assemblies increases load transfer between the jacket and the tension members, which results in improved load carrying performance. In some cases, increasing the adhesion between the jacket and the tension members increases the load carrying performance up to a tearing strength of the jacket material. If the adhesion at the interface between the jacket material and the tension members is weaker than the tearing strength of the structural elastomer used for the jacket, a decreased load carrying performance may not be experienced. Therefore, enhancing the adhesion between the jacket material and the tension members provides a stronger assembly.

The example adhesion enhancers provide unexpectedly increased adhesion compared to a polymer jacket material without one of them. In some examples, the adhesion strength is at least twice that which could be attained without the example adhesion enhancers.

With the example adhesion enhancers, the jacket of an assembly also has good thermal stability, hydrolytic stability, low hydrophilic characteristics and good compatibility to interact with other components such as an elevator sheave or a passenger conveyor step chain. The disclosed adhesion enhancers also provide flame-retardant properties to the jacket material.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elongated load bearing member configured to support a load that is suspended by the load bearing member, comprising:

at least one elongated tension member that supports the load in a longitudinal direction along the tension member; and a jacket covering at least some of the at least one tension member, the jacket comprising a thermoplastic polymer material that establishes an exterior surface of the jacket, the thermoplastic polymer material comprises a base polymer resin and a melamine-based adhesion enhancer mixed in with the base polymer resin, the melamine-based adhesion enhancer facilitates adhesion between the at least one tension member and the jacket.

2. The assembly of claim 1, wherein the melamine-based adhesion enhancer comprises at least one of melamine cyanurate, melamine-phosphate, melamine-pyrophosphate or melamine-polyphosphate.

3. The assembly of claim 1 wherein the polymer jacket comprises a thermoplastic elastomer.

4. The assembly of claim 1, wherein the polymer jacket comprises a thermoplastic polyurethane.

5. The assembly of claim 1, comprising a plurality of elongated cord tension members at least partially covered by the jacket.

6. The assembly of claim 1, wherein the assembly comprises an elevator load bearing member.

7. The assembly of claim 6, wherein the elevator load bearing member comprises a flat belt.

8. The assembly of claim 1, wherein the assembly comprises one of a passenger conveyor drive member and a passenger conveyor handrail.

9. The assembly of claim 8, wherein the drive member comprises a drive belt.

10. The assembly of claim 1, wherein the polymer material comprises up to 20% by weight of the adhesion enhancer.

11. The assembly of claim 10, wherein the polymer material comprises between about 0.2% and about 10% by weight of the adhesion enhancer.

12. A method of making an assembly having at least one elongated cord tension member at least partially covered by a jacket, comprising the steps of:

mixing a thermoplastic polymer material base resin with a melamine-based adhesion enhancer to yield a thermoplastic polymer jacket material;

placing the thermoplastic polymer jacket material against the at least one elongated cord tension member to form a desired shape of a jacket including an exterior surface established by the thermoplastic polymer jacket material and to adhere the jacket to the at least one elongated cord tension member.

13. The method of claim 12, wherein the melamine-based adhesion enhancer comprises at least one of melamine cyanurate, melamine-phosphate, melamine-pyrophosphate or melamine-polyphosphate.

14. The method of claim 12, wherein the amount of adhesion enhancer is between about 0.2% and about 10% by weight.

15. The method of claim 12, comprising:

mixing a polymer base resin and said adhesion enhancer to provide a batch of mixed material; and compounding said batch of mixed material with the polymer material to provide a batch of jacket material;

wherein said placing step uses said batch of jacket material.

* * * * *